(12) United States Patent
Hunt et al.

(10) Patent No.: US 6,182,586 B1
(45) Date of Patent: Feb. 6, 2001

(54) CONTROLLED PROBE SOIL INJECTION APPARATUS

(75) Inventors: Douglas R. Hunt, Chester; Keith Decker, Califon, both of NJ (US)

(73) Assignee: Tamke Tree Experts, Liberty Corner, NJ (US)

( * ) Notice: Under 35 U.S.C. 154(b), the term of this patent shall be extended for 0 days.

(21) Appl. No.: 09/356,634

(22) Filed: Jul. 19, 1999

(51) Int. Cl.[7] ............................. A01C 15/00; A01C 23/02
(52) U.S. Cl. ............................. 111/118; 405/263
(58) Field of Search .................... 405/269, 264, 405/263, 258; 111/118

(56) References Cited

U.S. PATENT DOCUMENTS

| | | | |
|---|---|---|---|
| 3,397,542 | * 8/1968 | Moulden | 111/118 X |
| 3,546,886 | 12/1970 | Jones et al. | |
| 3,583,744 | * 6/1971 | Paine et al. | 294/15 |
| 4,034,686 | 7/1977 | Collins | |
| 4,178,860 | 12/1979 | Hines et al. | |
| 4,226,140 | * 10/1980 | Gaasenbeek | 74/690 |
| 4,570,553 | 2/1986 | Ito | 405/269 X |
| 4,809,821 | * 3/1989 | Fulmer | 188/72.4 |
| 4,850,291 | * 7/1989 | Masuko et al. | 111/118 X |
| 4,903,618 | 2/1990 | Blair | 111/118 |
| 5,115,750 | 5/1992 | White et al. | 111/118 |
| 5,802,996 | 9/1998 | Baxter | 111/118 |

* cited by examiner

Primary Examiner—Christopher J. Novosad
(74) Attorney, Agent, or Firm—Mathews, Collins, Shepherd & Gould P.A.

(57) ABSTRACT

The present invention relates to a soil injection apparatus in which a probe having on insertion tip is inserted into the soil. A pair of probe guide assemblies are positioned adjacent each side of the probe to provide stability of the probe and prevent breaking of the probe. A probe hydraulic system extends and retracts the probe from the soil. A liquid pumping system pumps liquid into an outlet of the probe after insertion of the probe into the soil. A control system activates the probe hydraulic system and liquid pumping system. Preferably, a switch is used to activate the pumping system to pump liquid into the soil after the probe has been inserted a predetermined depth into the soil. The soil injection apparatus can be attached to a self-propelled vehicle. A carrier can be attached to the vehicle for holding debris removed from the soil injection site.

20 Claims, 10 Drawing Sheets

CONTROLLED PROBE SOIL INJECTION APPARATUS

BACKGROUND OF THE INVENTION

1. Field of the Invention

The present invention relates to a soil injection apparatus in which a plurality of probes are guided and independently controlled, thereby preventing probe breakage and preventing fluid from being dispersed until the probe reaches a defined depth.

2. Related Art

Conventional systems have been used to inject various chemicals to subsurface areas to effect the growth conditions of soils for grass, plants or trees. U.S. Pat. No. 4,903,618 discloses a soil injection system mounted to a conventional farm vehicle without modification to the chassis of the vehicle. The system includes a single, hydraulically operated ground penetrating bit with an attached fluid injector which are operated to penetrate the ground. The penetrating bit is designed to be coupled to and powered by the vehicle's hydraulic system. The system further includes a chemical (fluid) supply tank, a pressurization tank and a chemical metering tank. The pressurization tank supplies pressurized gas to the chemical supply tank to transfer chemicals from the chemical supply tank to the chemical metering tank. The pressurization tank also supplies pressurized gas to the chemical metering tank to force the chemicals contained therein into the fluid injector when the bit is penetrating the ground.

U.S. Pat. No. 5,802,996 describes a mobile or portable soil aerator fertilizer system. The system includes a wheeled frame that mounts a tank and a hydraulic pump that operates hydraulically actuated probes which penetrate the ground. A compressor mounted on the frame delivers compressed air to the probes when the probes are in the ground. The air is released through discharge openings in the probes. Liquid fertilizer and other like materials stored in the tank can be delivered to the probes for discharge into the ground through the openings in the probes. The wheels of the frame can be removed to allow the system to be attached to the flat bed of a truck.

U.S. Pat. 5,115,750 describes a subsoil treatment apparatus mounted on the back of a truck bed. The apparatus includes an air compressor and a plurality of hydraulically powered hammers that drive spikes into the ground. The hammers are driven by a hydraulic pump powered by the engine of the truck. Compressed air supplied by the compressor is injected into the ground via apertures in the spikes to break up, loosen and aerate compacted soil.

U.S. Pat. No. 3,546,886 describes a soil treating apparatus mounted on the back of a truck bed. The apparatus includes a hydraulic system that causes an injector pipe with an injector point mounted at its free end to be deeply inserted into the ground (20 or more feet) in a step-by-step manner to enable the soil to be treated at different depths. At the end of each insertion step, soil treating slurry is injected via the injector point. The above-described patents have the limitation that probes can easily break off when inserted into excessive resistance in the soil and will continue to disperse fluid into the soil at uneven depths or on the top of the soil.

It is desirable to provide a soil injection apparatus in which a plurality of probes are guided to prevent breakage and are controlled to emit fluid only after the probe reaches a defined depth.

SUMMARY OF THE INVENTION

The present invention relates to a soil injection apparatus in which a probe having on insertion tip is inserted into the soil. A pair of probe guide assemblies are positioned adjacent each side of the probe to provide stability of the probe and prevent breaking of the probe. A probe hydraulic system extends and retracts the probe from the soil. A liquid pumping system pumps liquid into an outlet of the probe after insertion of the probe into the soil. A control system activates the probe hydraulic system and liquid pumping system. Preferably, the control system includes a multiple position switch for controlling upward and downward movement of the probe and of pumping the liquid.

A switch can be attached to the probe guide assemblies and the liquid pumping system. The switch is closed when the probe extends a predetermined depth into the soil to activate the liquid pumping system. Accordingly, liquid is only pumped to probes that have been extended a predetermined depth into the soil, thereby preventing untimely disbursement of the liquid.

The soil injection apparatus can be attached to a self-propelled vehicle. Preferably, a holding tank for the liquid and probe guide assembly can be attached to a frame which is removable attached to the vehicle. The vehicle can be steered with skid-steering.

The invention will be more fully described by reference to the following drawings.

The invention will be more fully illustrated by reference to the following drawings.

DETAILED DESCRIPTION

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1:
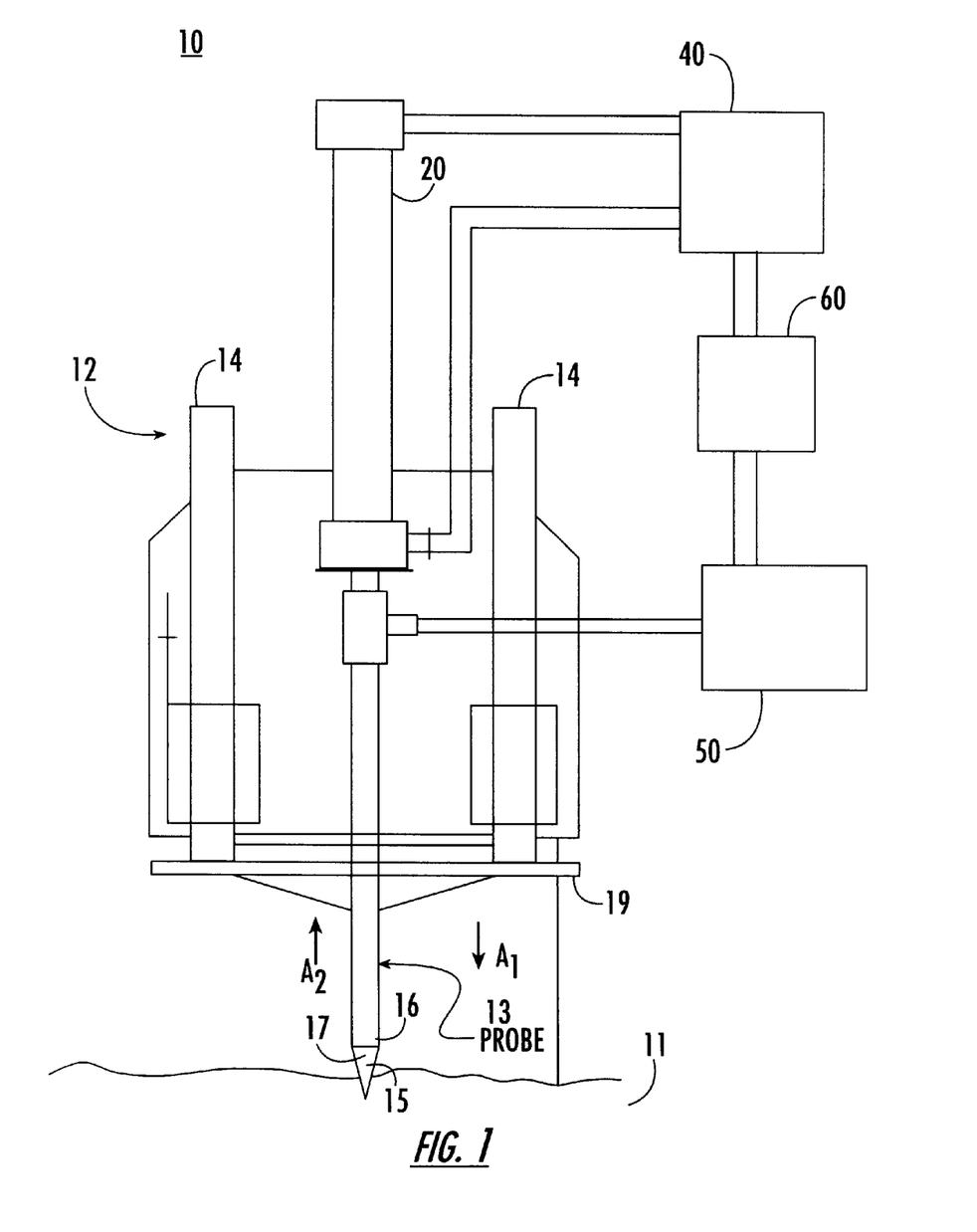
FIG. 1 is a schematic diagram of a controlled probe soil injection apparatus.

FIG. 1 illustrates a schematic diagram of a controlled probe soil injection apparatus 10 in accordance with the teachings of the present invention. Probe guide assembly 12 is coupled to probe hydraulic system 40. Probe 13 moves within hydraulic cylinder 20. Hydraulic cylinder 20 is activated and deactivated by probe hydraulic system 40. Liquid pumping system 50 pumps liquid to probe guide assembly 12 and into ground 11. Control system 60 activates probe hydraulic system 40 for extending probe 13 in the direction of arrow A1 into soil 11 and retracting probe 13 in the direction of arrow $A_2$ away from soil 11. After probe 13 is inserted into ground 11, control system 60 activates liquid pumping system 50 for pumping liquid into probe 13.

FIGS. 2A–2D are detailed views of probe guide assembly 12 and its relationship to probe 13. Insertion tip 15 is formed at end 16 of probe 13. Insertion tip 15 is pointed for piercing soil 11 to insert probe 13 into ground 11. A pair of probe guides 14 are positioned adjacent each side of probe 13 to provide support for probe 13, thereby preventing bending or breaking of probe 13 when insertion tip 15 encounters resistance from ground 11. For example, resistance on insertion tip 15 can occur because of a rock, root or other subsurface obstacles. Probe 13 has a hollow fluid passage 18 connected to probe outlet 17. Probe outlet 17 is formed in insertion tip 15. A plurality of probe outlets 17 can be formed in insertion tip 15. Probe guides 14 and probe 13 are attached to backsplash plate 19. Upon insertion of insertion tip 15 into ground 11, backsplash plate 19 is positioned adjacent the surface of ground 11 to prevent injected liquid from reaching the surface of ground 11.

Hydraulic cylinder 20 is attached to frame 21. Hose connection 22 connects hose 23 to liquid pumping system 50. Liquid 24 flows from liquid pumping system 50 through hose 23 to probe outlet 17. Suitable liquids 24 include liquid fertilizer, soil pH adjusting agents, mycorrhizae and other conventional root promoting materials, pesticides and fungicides that are absorbed by plants or used to treat soil.

Figure 2A:
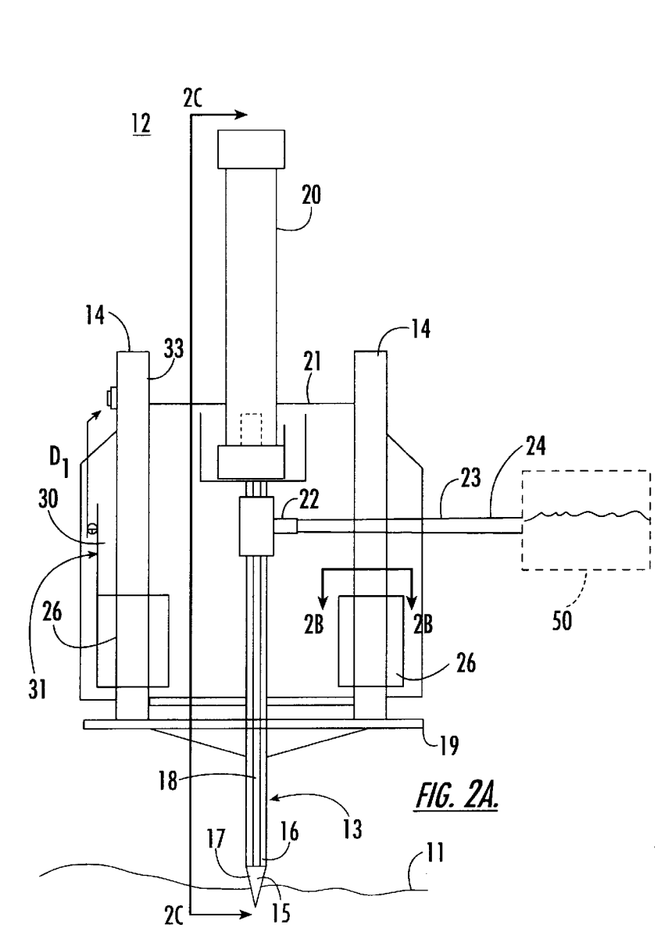
FIG. 2A is a schematic diagram of a probe guide assembly and a probe in a retracted position.
Figure 2B:
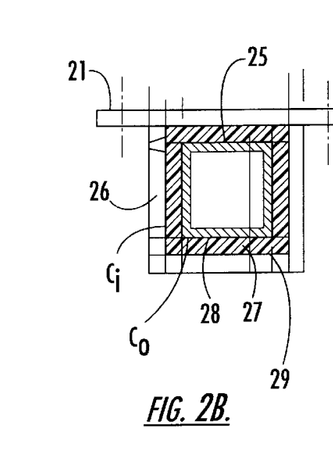
FIG. 2B is a horizontal cross-sectional view of the probe guide assembly along section A of FIG. 2A.

Probe guide 14 comprises inner probe guide 25 movable within probe support guide 26, as shown in FIG. 2B. Inner probe guide 25 has a cross-sectional shape matching the cross-sectional shape of probe guide support 26. For example, inner probe guide 25 and probe guide support 26 can have a square cross-sectional shape with the outer circumference $C_o$ of inner probe guide 25 being smaller than the inner circumference $C_i$ of probe guide support 26. Preferably, friction reducing material 27 is inserted between outer surface 28 of inner probe guide 25 and inner surface 29 of probe guide support 26. A suitable friction reducing material 27 is phenolic wear strips. Probe guide support 26 is attached to frame 21.

Switch 30 is attached by switch connection 31 to probe guide support 26, as shown in FIG. 2A. Switch contact 32 is attached to upper portion 33 of probe guide 25. Switch 30 can be placed at a distance along switch connection 31 to change the distance $D_1$ between switch 30 and switch contact 32, thereby controlling the depth needed for probe 13 to extend into ground 11 before contact is made between switch 30 and switch contact 32. In the closed position, switch 30 activates liquid pumping system 50. For example, a suitable distance $D_1$ can be six to eight inches. A suitable switch 30 is a magnetic switch.

Figure 2C:
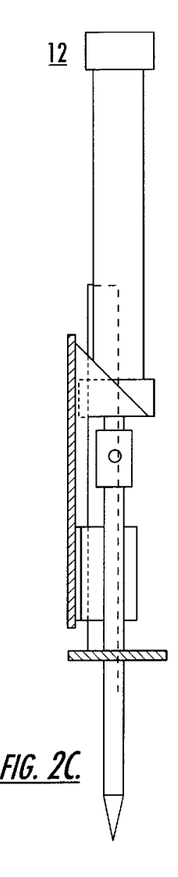
FIG. 2C is a side cross-sectional view of the probe along section B of FIG. 2A.

As shown in FIGS. 2A and 2C, probe 13 is fully retracted within hydraulic cylinder 20. In this position insertion tip 15 of probe 13 is located above ground 11. Switch 30 is in the open position and switch 30 does not contact switch contact 32.

Figure 2D:
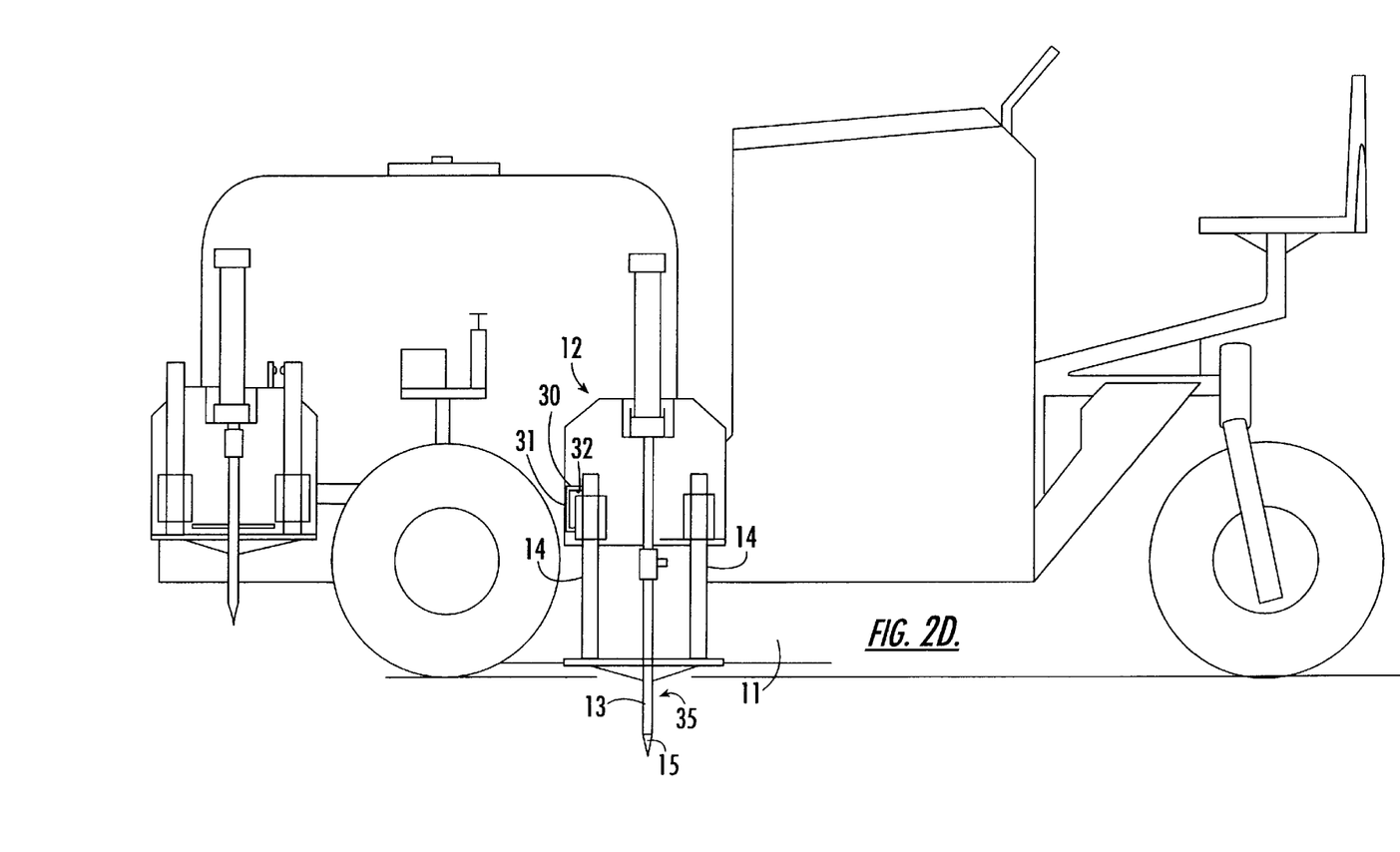
FIG. 2D is a schematic of the probe guide assembly and probe in an extended position.

As shown in FIG. 2D, probe 13 is fully extended from hydraulic cylinder 20 to force insertion tip 15 and lower portion 35 of probe 13 into ground 11. Switch 30 is in the closed position and switch 30 contacts switch contact 32.

Figure 3:
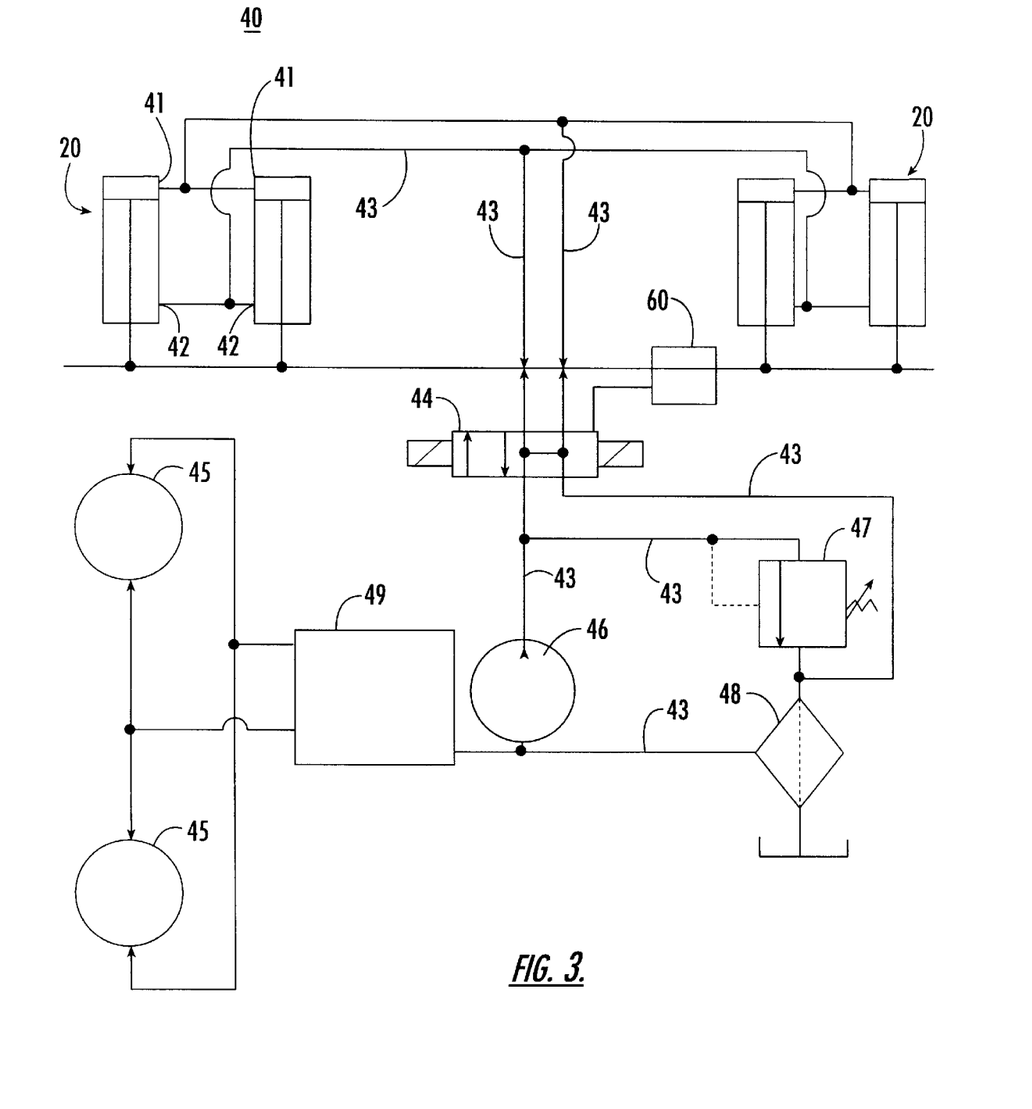
FIG. 3 is a schematic diagram of a probe hydraulic system.

FIG. 3 illustrates is a schematic diagram of probe hydraulic system 40 for controlling the hydraulic pressure of hydraulic cylinder 20. Preferably hydraulic cylinder 20 is a double acting cylinder to extend and retract probe 13 upon application of hydraulic fluid to respective ports 41 and 42. Valve 44 is activated by control system 60 to provide movement of the probe up and probe down position, as described in more detail below. When valve 44 is activated into the probe up position, hydrostatic transmission 49 powers hydraulic motors 45 to pump hydraulic fluid from hydraulic fluid reservoir 46 to port 41 of hydraulic cylinder 20. The application of pressurized hydraulic fluid into hydraulic cylinder 20 extends probe 13. When valve 44 is activated into the probe down position, valve 44 is opened to relief valve 47 to allow hydraulic fluid to escape from port 42. The escape of pressurized hydraulic fluid retracts probe 13 into hydraulic cylinder 20. Retracted hydraulic fluid is filtered by filter 48 and returned to hydraulic fluid reservoir 46. Fluid connection 43 connects hydraulic cylinder 20, valve 44, hydraulic fluid reservoir 46, relief valve 47 and filter 48. It will be appreciated that a conventional hydraulic double acting cylinder can be used in accordance with the teachings of the present invention.

Figure 4:
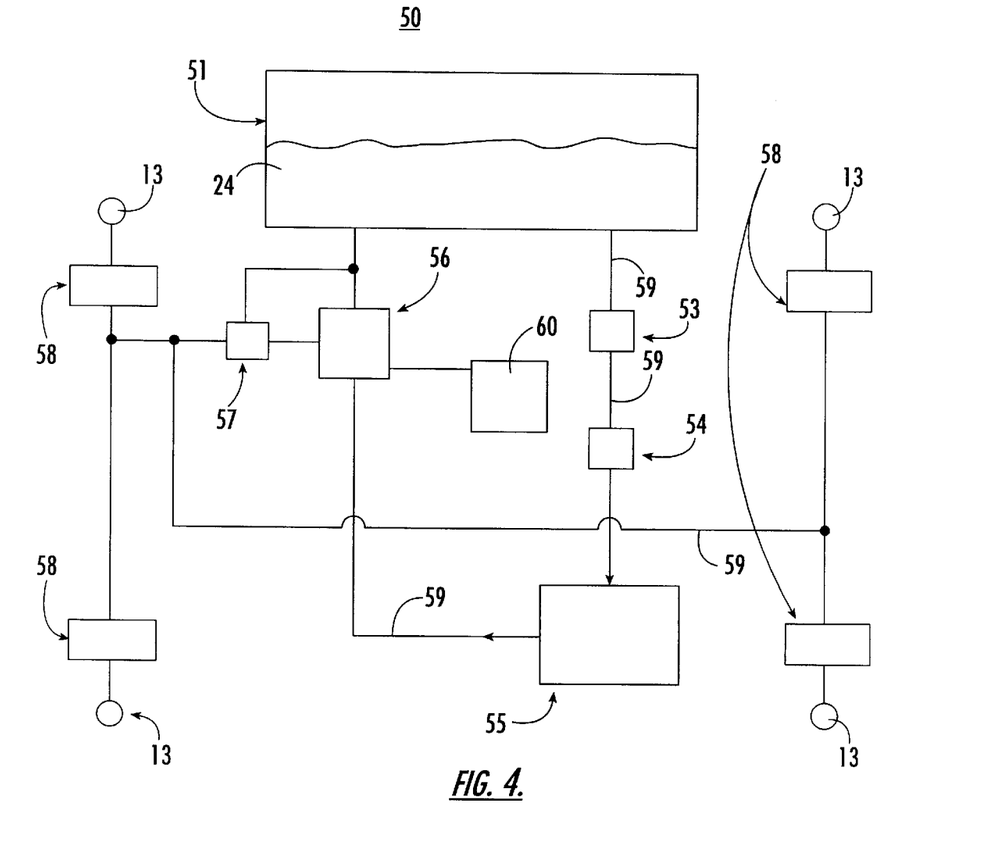
FIG. 4 is a schematic diagram of a liquid pumping system.

FIG. 4 illustrates a schematic diagram of liquid pumping system 50. Tank 51 retains liquid 24. For example, tank 51 can be a 100 gallon supply tank. Tank 51 is connected with ball valve 53 through strainer 54 to diaphragm pump 55. Ball valve 56 is controlled by control system 60, to activate and deactivate liquid pumping system 50. When ball valve 56 is activated, ball valve 56 is opened to allow fluid to flow to ball valves 58. Pressure regulator 57 adjusts the pressure of fluid being pumped by diaphragm pump 55. Probe ball valves 58 are connected respectively to each probe 13. Probe ball valves 58 are activated by a respective switch 30 to open when switch 30 is in contact with switch contact 32 and to close when switch 30 is not in contact with switch contact 32. Fluid connection 59 connects tank 51, ball valve 53, strainer 54, diaphragm pump 55, ball valve 56, pressure regulator 57 and probe valves 58.

Figure 5:
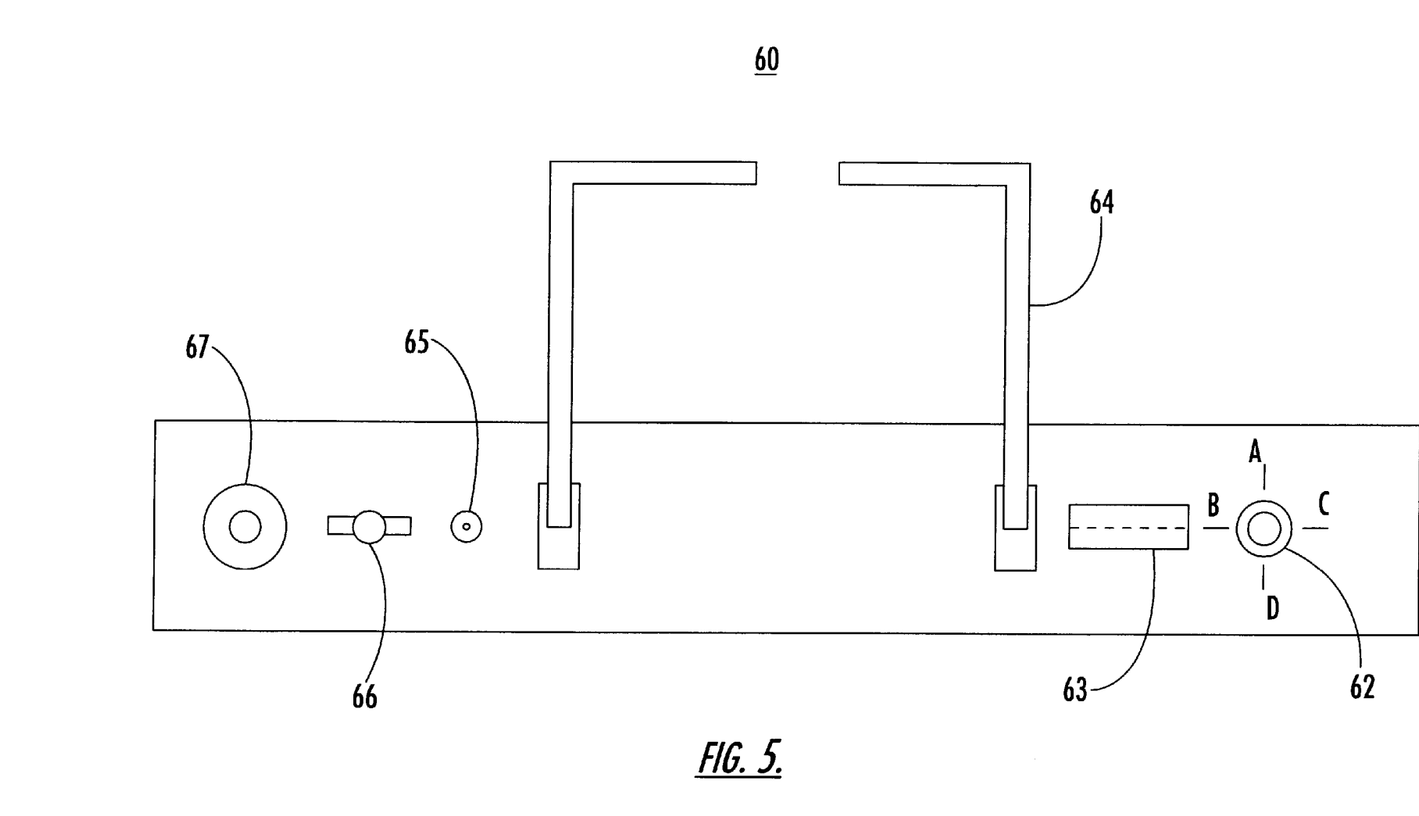
FIG. 5 is a schematic diagram of a control system.

FIG. 5 illustrates a schematic diagram of control system 60. Control system 60 includes switch 62. Switch 62 is moved in a plurality of positions A-D for activating probe hydraulic system 40 and liquid pumping system 50. A suitable switch 60 is a joy stick. For example, in this embodiment, position A represents the probe down position to activate probe hydraulic system 40 to move probe 13 downward. Position B represents the liquid position to activate liquid pumping system 40 to pump liquid into probe 13. Position D represents the probe up position to activate probe hydraulic system 40 to move probe 13 upward. Position C is not assigned but could be used to represent other control features. Pressure regulator interface 63 can be used to activate pressure regulator 57, thereby adjusting the flow of liquid to probe 13. Skid steering control 64 can be used to control steering of vehicle attached to probe soil injection apparatus 10. Control system 60 can also include ignition switch 65, choke 66 and engine throttle 67 which are conventional.

Figure 6A:
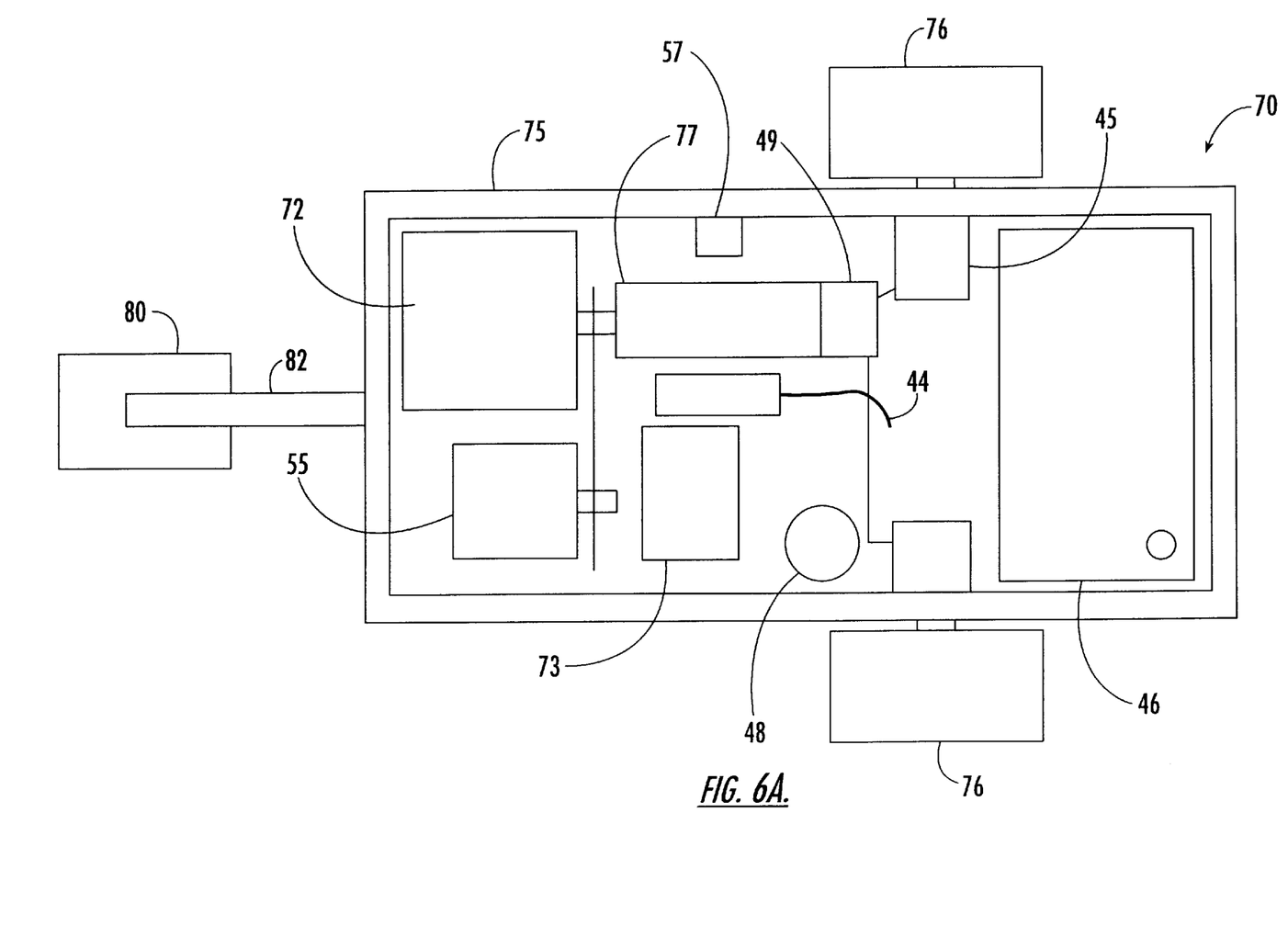
FIG. 6A is a top view of attachment of the controlled probe soil apparatus to a vehicle.
Figure 6B:
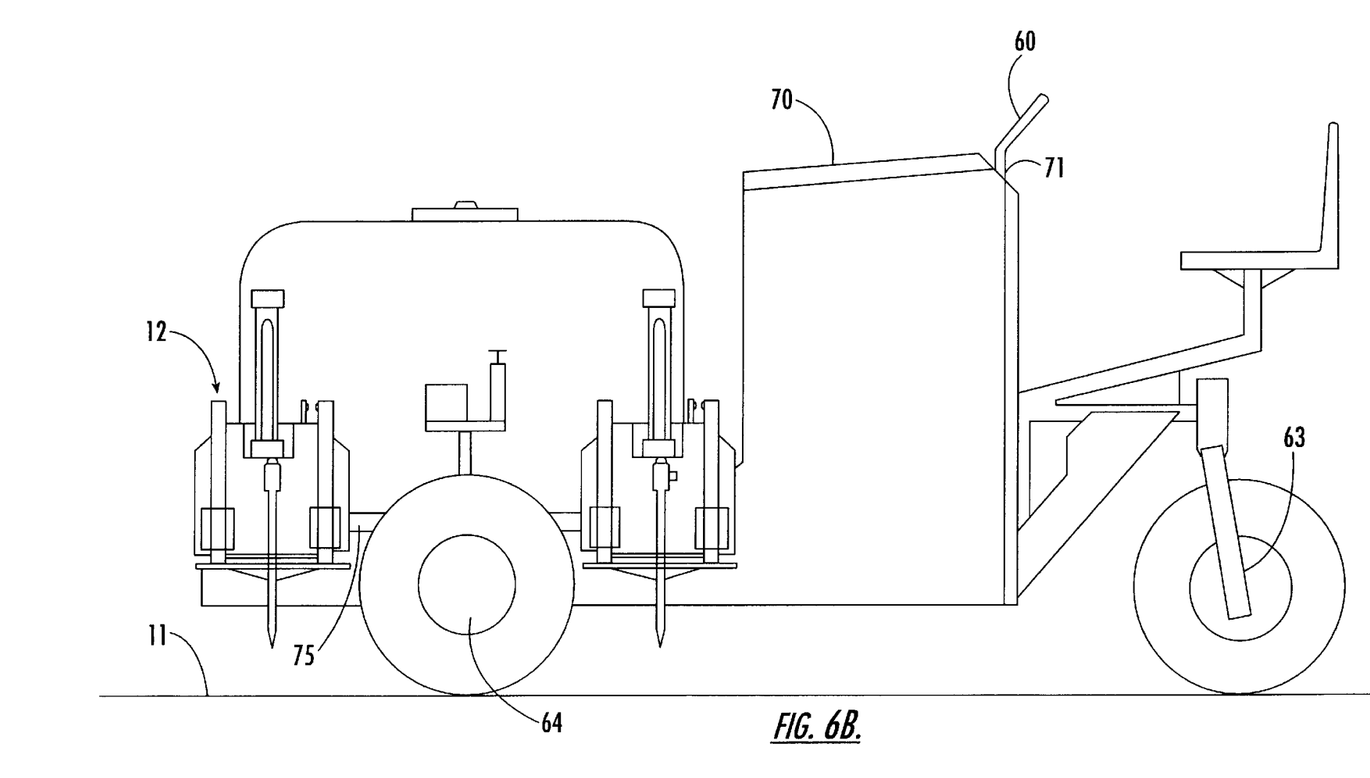
FIG. 6B is a side elevational view of the controlled probe soil injection apparatus in a retracted position attached to the vehicle.
Figure 6C:
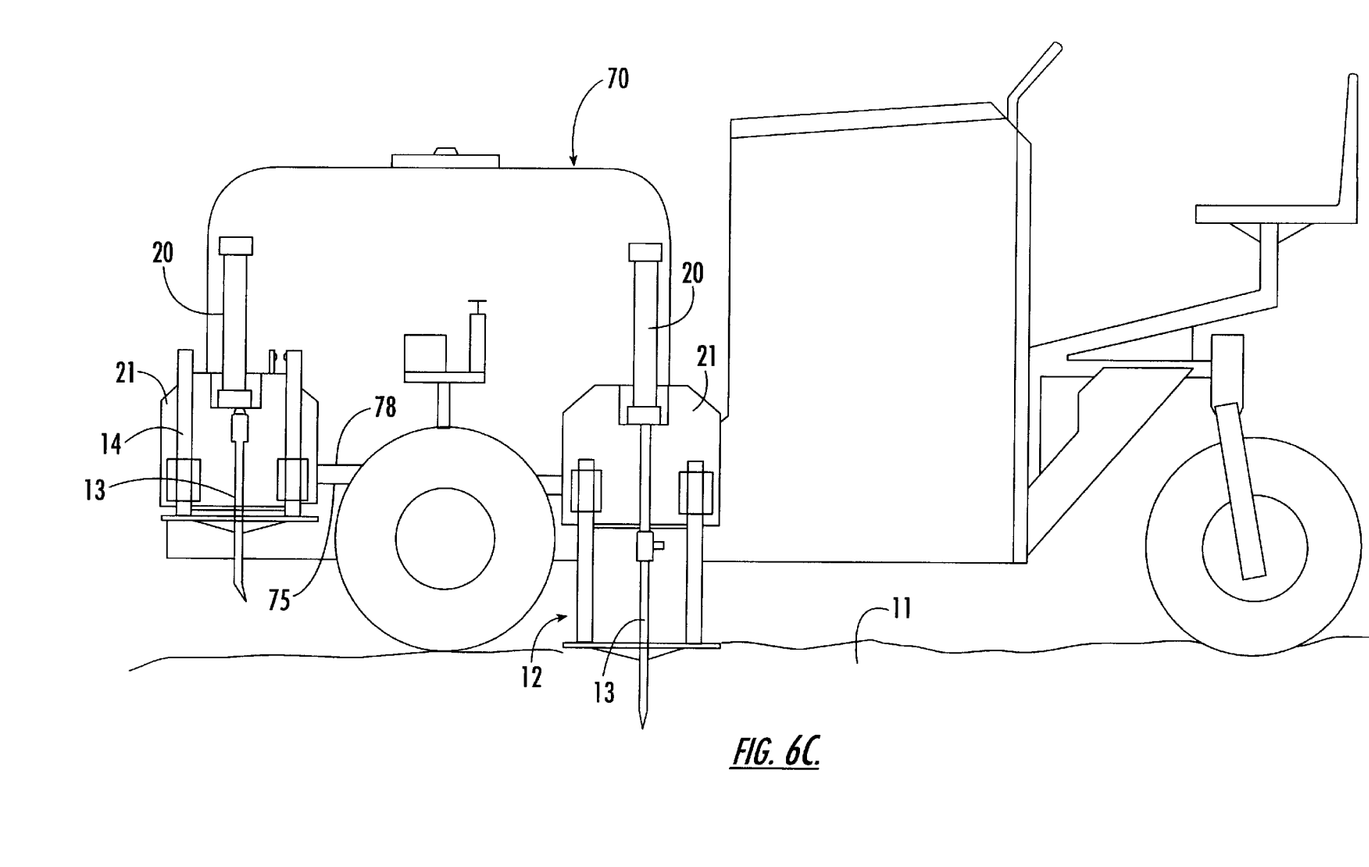
FIG. 6C is a side elevational view of the controlled probe soil injection apparatus in the extended position attached to the vehicle.

FIGS. 6A–6C illustrate an embodiment of attachment of probe soil injection apparatus 10 to vehicle 70. Probe hydraulic system 40 and liquid pumping system 50 are held by frame 75 of vehicle 70. Control system 60 is attached to an upper portion 71 of vehicle 70 which is accessible by a driver of vehicle 70. Preferably, vehicle 70 is a self-propelled vehicle having wheels 76 attached to skid steering transmission 77. Skid steering transmission 77 can be controlled with skid steering control 64. Engine 72 powers hydrostatic transmission 49 for powering hydraulic pumps 45. Hydraulic pumps 45 pump fluid from hydraulic fluid reservoir 46 and back through filter 48. Battery 73 powers diaphragm pump 55. Pressure regulator 57 controls pressure in diaphragm pump 55. It will be appreciated that various positions in frame 75 can be used for components of probe hydraulic system 40 and liquid pumping system 50.

FIG. 6B illustrates probe soil injection apparatus 10 in a retracted position in which probe 13 is positioned above ground 11. Frame 21 is mounted on frame 78. Tank 51 is removably attached to frame 78. Frame 78 is removably supported or coupled to frame 75. Probe 13 is retracted within hydraulic cylinder 20. FIG. 6C illustrates probe injection apparatus 10 in an extended position. Probe 13 is extended from hydraulic cylinder 20 into ground 11.

Figure 7A:
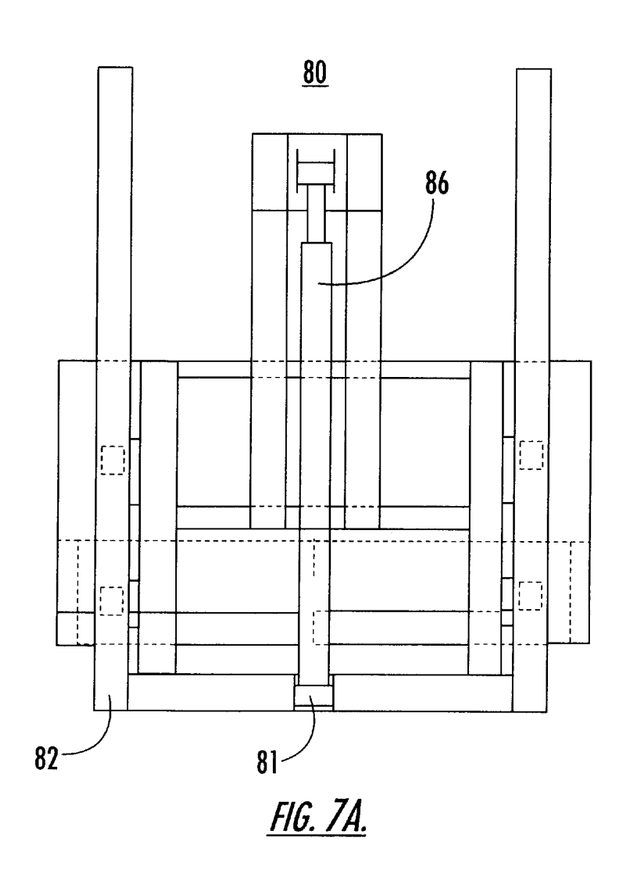
FIG. 7A is an end view of a carrier apparatus which is attached to the vehicle in combination with the soil injection apparatus.
Figure 7B:
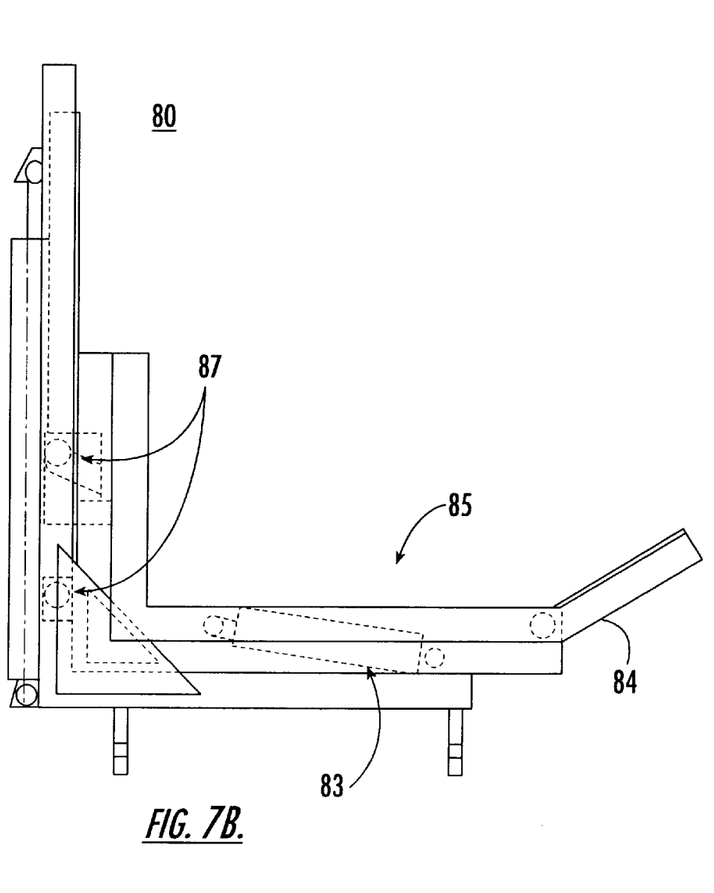
FIG. 7B is a side view of the carrier apparatus.

FIGS. 7A and 7B illustrate a schematic diagram of a carrier apparatus 80 than can be attached to vehicle 70 in combination with soil injection apparatus 10. For example, unwanted trees, wood or other debris encountered at a soil treatment site can be loaded onto carrier apparatus 80. Connection 81 of frame 82 attaches to vehicle 70. Platform 85 is attached to frame 82. Dump cylinder 83 raises and lowers end 84 of platform 85 for loading material onto platform 85. Lift cylinder 86 raises and lowers platform 84 with roller guides 87. For example, platform 85 can be raised a distance of 4 to 5 feet for loading material onto a dump truck to be hauled away from the soil treatment site. Preferably, lift cylinder 86 is a hydraulic cylinder. Lift cylinder 86 can be connected to valve 44 for using hydraulic motors 45 to apply and retract hydraulic fluid to and from lift cylinder 86.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

What is claimed is:

1. A soil injection apparatus comprising:
   at least one probe having an insertion tip at a lower end thereof with a probe outlet therein;
   a pair of probe guides positioned adjacent each side of said at least one probe, each of said probe guides comprises an inner probe guide moveable within a probe support guide;
   probe hydraulic means for extending said at least one probe into the soil and retracting said at least one probe from the soil;
   liquid pumping means for pumping liquid to said probe outlet after said at least one probe is inserted into the soil; and
   control means for activating said probe hydraulic means and said liquid pumping means,
   wherein each of said inner probe guides move downwardly when said at least one probe is extended such that each of said inner probe guides are adjacent a side of said at least one probe.

2. The apparatus of claim 1 wherein said probe support guide has a cross-sectional shape matching the cross-sectional shape of the inner probe guide.

3. The apparatus of claim 2 further comprising:
   friction reducing material inserted between an outer surface of said inner probe guide and an inner surface of said probe support guide.

4. The apparatus of claim 3 wherein said friction reducing material is formed of a phenolic material.

5. The apparatus of claim 1 further comprising:
   switch means for activating said liquid pumping means when said at least one probe reaches a predetermined depth in said soil.

6. The apparatus of claim 1 wherein said at least one probe and said guides are attached to a backsplash plate.

7. The apparatus of claim 1 wherein said hydraulic means comprises:
   a hydraulic cylinder with respective ports for introducing and extracting hydraulic fluid and an upper end of said at least one probe being received in said hydraulic cylinder with said lower end extending outwardly from said hydraulic cylinder.

8. The apparatus of claim 7 further comprising:
   valve means for selectively controlling flow of said hydraulic fluid, said valve means being coupled to said control means, wherein when said control means is activated in a probe down position hydraulic fluid is introduced by said valve means to said hydraulic cylinder and when said control means is activated in a probe up position hydraulic fluid is extracted from said hydraulic cylinder.

9. The apparatus of claim 8 further comprising:
   a source of said hydraulic fluid and at least one pump for pumping said hydraulic fluid to said valve means.

10. The apparatus of claim 7 wherein said hydraulic cylinder and said probe guides are attached to a frame.

11. The apparatus of claim 1 further comprising:
    a vehicle, wherein said at least one probe, said probe guides, said liquid pumping means, said probe hydraulic means and said control means are attached to said vehicle.

12. The apparatus of claim 11 wherein said at least one probe, said probe guide and a tank for holding the liquid are attached to a frame, said frame is removably attached to said vehicle.

13. A soil injection apparatus comprising:
    at least one probe having an insertion tip at a lower end thereof with a probe outlet therein;
    a pair of probe guides positioned adjacent each side of said at least one probe;
    probe hydraulic means for extending said at least one probe into the soil and retracting said at least one probe from the soil;
    liquid pumping means for pumping liquid to said probe outlet after said at least one probe is inserted into the soil;
    control means for activating said probe hydraulic means and said liquid pumping means; and
    switch means for activating said liquid pumping means when said at least one probe reaches a predetermined depth in said soil, said switch means comprises:
    a switch attached with a switch connector to said probe support guide and a switch contact attached to a portion of said inner probe guide, said switch being positioned at a predetermined distance on said switch connector to control the depth needed for said at least one probe to extend into the soil before contact is made between said switch and said switch contact.

14. A soil injection apparatus comprising:
    at least one probe having an insertion tip at a lower end thereof with a probe outlet therein;
    a pair of probe guides positioned adjacent each side of said at least one probe;

probe hydraulic means for extending said at least one probe into the soil and retracting said at least one probe from the soil;

liquid pumping means for pumping liquid to said probe outlet after said at least one probe is inserted into the soil; and control means for activating said probe hydraulic means and said liquid pumping means, wherein said liquid pumping means comprises:
a tank for holding liquid; and
a tank ball valve connected to said tank, said tank ball valve being activated by said control means.

15. The apparatus of claim 14 further comprising:
a diaphragm pump connected to said tank ball valve; and
a pressure regulator for adjusting the flow of said liquid to said probe hydraulic means.

16. The apparatus of claim 15 further comprising:
a probe ball valve attached to said at least one probe; and
switch means for activating said probe valve when said probe reaches a predetermined depth.

17. A soil injection apparatus comprising:
at least one probe having an insertion tip at a lower end thereof with a probe outlet therein;
a pair of probe guides positioned adjacent each side of said at least one probe;
probe hydraulic means for extending said at least one probe into the soil and retracting said at least one probe from the soil;
liquid pumping means for pumping liquid to said probe outlet after said at least one probe is inserted into the soil; and
control means for activating said probe hydraulic means and said liquid pumping means, wherein said control means comprises a switch moveable in a plurality of positions,
wherein a first position of said switch is a probe down position for activating said probe hydraulic means to move said at least one probe downward; a second position of said switch is a liquid position for activating said liquid pumping means to pump said liquid to said at least one probe; and a third position of said switch is a probe up position for activating said hydraulic means to move said at least one probe upward.

18. A soil injection apparatus comprising:
at least one probe having an insertion tip at a lower end thereof with a probe outlet therein;
a pair of probe guides positioned adjacent each side of said at least one probe;
probe hydraulic means for extending said at least one probe into the soil and retracting said at least one probe from the soil;
liquid pumping means for pumping liquid to said probe outlet after said at least one probe is inserted into the soil;
control means for activating said probe hydraulic means and said liquid pumping means; and
a carrier apparatus attached to said vehicle for carrying material located at a site of said soil injection apparatus.

19. The apparatus of claim 18 wherein said carrier apparatus comprises:
a dump cylinder for raising and lowering an end of a platform; and
a lift cylinder for raising and lowering said platform, after said material is received on said platform.

20. The apparatus of claim 19 wherein said lift cylinder is connected to said probe hydraulic means for applying hydraulic fluid to said lift cylinder for raising and lowering said lift cylinder.

* * * * *